United States Patent [19]

Hahn et al.

[11] Patent Number: 4,915,609
[45] Date of Patent: Apr. 10, 1990

[54] SINTERING DEVICE FOR BLANKS OF FOAMABLE PLASTICS WITH UNDERCUTS

[75] Inventors: Ortwin Hahn; Gottfried Wimmer, both of Paderborn, Fed. Rep. of Germany

[73] Assignee: Klevotec, Gesellschaft Fur Rechnergestutzte Systemanwendungen GmbH Co. K.G., Fed. Rep. of Germany

[21] Appl. No.: 187,179

[22] Filed: Apr. 28, 1988

[30] Foreign Application Priority Data

Oct. 16, 1987 [EP] European Pat. Off. ........ 87115136.1

[51] Int. Cl.$^4$ .............................................. B29C 33/04
[52] U.S. Cl. ...................................... 425/384; 249/79; 249/116; 249/135; 249/141; 249/152; 249/180; 249/184; 425/817 R; 425/DIG. 58
[58] Field of Search ................. 249/59, 63, 64, 116, 249/135, 141, 152, 180, 184; 425/4 R, 144, 543, 546, 577, 384, DIG. 5, DIG. 58; 264/318

[56] References Cited

U.S. PATENT DOCUMENTS

| | | | |
|---|---|---|---|
| 3,712,778 | 1/1973 | Lidl | 425/817 R |
| 3,946,981 | 3/1976 | Frank | 425/817 R |
| 4,130,264 | 12/1978 | Schröer | 249/180 |
| 4,362,291 | 12/1982 | Fuke et al. | 249/180 |
| 4,533,312 | 8/1985 | Von Holdt | 249/152 |
| 4,541,605 | 9/1985 | Kubota et al. | 249/184 |
| 4,546,951 | 10/1985 | Boschman | 249/135 |
| 4,731,014 | 3/1988 | Von Holdt | 249/152 |
| 4,813,859 | 3/1989 | Bullard et al. | 425/817 R |

FOREIGN PATENT DOCUMENTS

| | | | |
|---|---|---|---|
| 2049960 | 3/1971 | France | 249/180 |
| 56-4345 | 1/1981 | Japan | 249/135 |
| 59-179311 | 10/1984 | Japan | 249/135 |
| 2155843 | 10/1985 | United Kingdom | 249/135 |

*Primary Examiner*—James C. Housel
*Attorney, Agent, or Firm*—William A. Drucker

[57] ABSTRACT

A sintering device includes separable mould walls which together define a mould cavity and a mould core which is positioned within the cavity to define an undercut mould surface. The core includes a hollow frusto-pyramidal central support formed with guideways and a plurality of core segments mounted for slidable movement within the guideways whereby the core is radially expandable and contractable. The segments include a plurality of arc-surface segments alternating with trapezoidal segments. The mould walls and the core include passages for introducing steam and air into the cavity. The passages of the core place the hollow interior of the central support in communication with the mould cavity.

6 Claims, 1 Drawing Sheet

SINTERING DEVICE FOR BLANKS OF FOAMABLE PLASTICS WITH UNDERCUTS

BACKGROUND OF THE INVENTION

The invention relates to a sintering device for a blank of foamable, prefoamed plastics. The device comprises mould walls separable from each other. Between the walls is formed a mould cavity in communication with a controllable injector for the plastics. Passages in communication with chambers which surround these mould walls are provided and to which process steam (optionally sub-pressure) and/or compressed air can be controllably supplied. In the cavity there is arranged at least one mould core which consists of a fixed jacket of controllably changeable form.

DESCRIPTION OF THE PRIOR ART

A moulding device is known from EP-OS 83 102 413 for the sintering of blanks of foamable, prefoamed plastics, e.g. polystyrene, which comprises mould walls separable from each other and a displaceable mould core. A mould cavity is formed between the mould walls into which leads an injector for the supply of the pre-expanded plastics and passages to supply process steam for heating the mould walls and the mould core and for sintering the plastics and supplying sub-pressure and compressed air for cooling or ejecting a finished blank. The mould core consists of a resilient hose, which surrounds a tube as a jacket, and can so be increased in its diameter by the supply of compressed air that, after subsequent pressure reduction, the mould core is released from the blank and supported on the tube, so that it can be withdrawn unhindered. It is only possible with the known device to manufacture blanks, recesses of which, according to the mould core form and the radial cross sectional widening by the compressed air, have a widened cross section in the mould core withdrawal direction with a demoulding conicity or, if need be, have a constant cross section.

It is further known, for full mould casting technology, to jacket fusible mouldings of foamed and sintered plastics casting-resiliently and to use them as fusible cores, with which similarly formed thin-walled castings may be manufactured, the fusible cores being capable of being fixed together into complicated component groups of several mouldings usually by adhesion, the groups forming hollow bodies for example and comprising recesses with undercuts and/or curves varying in the axial direction, which requires considerable time and labour and brings with it assembly tolerances.

SUMMARY OF THE INVENTION

The present invention sets out to disclose a device for producing one-piece blanks which comprise recesses with undercuts and/or varying curves.

The problem is solved in that the jacket of the mould core is locationally fixed in the mould cavity and its form is alterable controllably between two positions in such a way that in the first position a jacket area projecting deeper into the mould cavity comprises a larger radius with respect to a core axis than a narrower jacket area positioned further towards the edge and in that in the second position the jacket area projecting deeper into the mould cavity has a decreased radius, which corresponds at most to that of the narrowest radius of the jacket area lying further towards the exterior in the first position.

The undercuts may be constructed both circularly and sectorially, the outer contour being predeterminable within a broad framework, such that especially cores for full mould casting technology can be produced, with which hollow bodies with undercuts and several curves over their longitudinal extent can be produced in one piece. These one-piece hollow bodies have lower dimensional tolerances and no misaligned edges owing to the lack of abutment points in comparison with hollow bodies assembled from several parts.

In an embodiment according to the invention, the mould core is advantageously provided as a supporting core with dovetail sliding guides pyramid-shaped in the axial direction, on which guides is arranged a jacket of displaceable jacket parts, which in turn are accommodated radially displaceably, such that when the supporting core is displaced axially the jacket parts are displaced radially expandingly or contractingly. The contact surfaces of the jacket parts are advantageously so constructed that they slide against each other during displacement. The axial displacement of the supporting core is appropriateldy effected by a compressed air drive. The supporting core is hollow in constructions for the supply of process and hot steam and of cooling and demoulding media and is connected by a tube with a media supply device. Passages in the form of bores with nozzle inserts are introduced to the mould cavity from the core interior.

The metal mould parts are advantageously made of light metal, the metal surfaces of the mould wall being hardened, and especially the guide surfaces of the supporting cores, so that frequent insertion and removal of the supporting cores does not lead to harmful wear of the mould walls or bearing surfaces. To this end titanium coating of the surface or its nitrification under electron beam bombardment has proven practical. Surface treatment by electron beam or with a laser beam at the same time makes it advantageously possible to insert the steam passages into the mould wall. Distribution of the passages can be optimally adapted to the requirements of blank construction and the cross sections of the passages themselves can be kept so small that virtually no images of the openings arise on the blank in the form of holes or burls.

BRIEF DESCRIPTION OF THE DRAWINGS

The invention will now be described by way of example only, with reference to the accompanying diagrammatic drawings, in which.

DETAILS AND DESCRIPTION OF THE PREFERRED EMBODIMENTS

Figure 1:
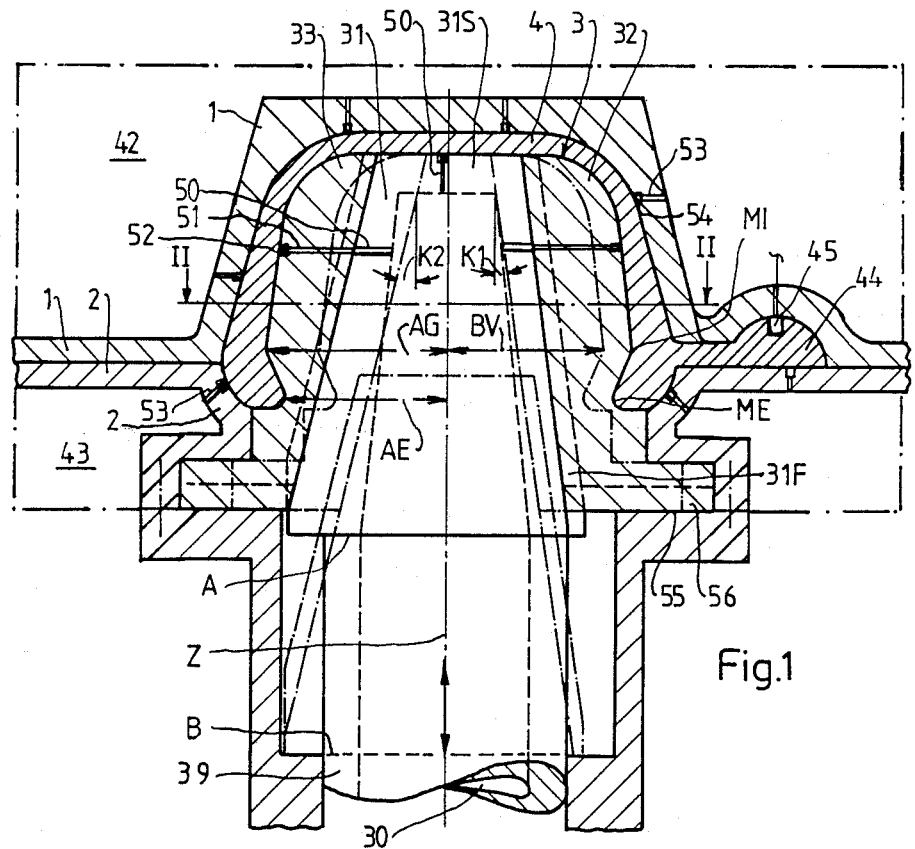
FIG. 1 is a section of a moulding device with a mould core in accordance with the invention taken along the line I—I of FIG. 2.

FIG. 1 shows a moulding device consisting of two mould walls (1,2) arranged to be displaceable towards each other (the displacement device and mounting are not shown). The walls (1,2) enclose a mould cavity (4) into which opens an injector. The mould walls (1,2) are surrounded by chambers (42,43), out of which passages (53) with nozzles (54) lead into the mould cavity (4). The chambers (42,43) are connected in a known way controllably with a steam, compressed air, vacuum and discharge device, such that the process steps comprising filling, heating, sintering, cooling and demoulding can be carried out successively and are cyclicly controllable.

Figure 2:
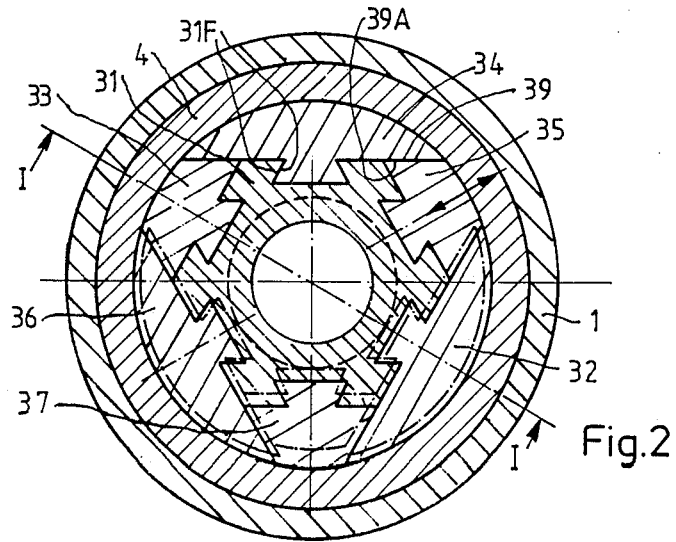
FIG. 2 is a section taken along line II—II of FIG. 1.

In the mould wall (2) there is inserted a mould core (3). This consists of a pyramid-shape supporting core (31), on which jacket parts (32,34,36; 33,35,37) (c.f. FIG. 2) are arranged surroundingly and displaceably with complementary guides (31F) in the manner of a dovetail guide. Three of the jacket parts (32.34.36) comprise a circular segment cross section, and the jacket parts (33,35,37) lying therebetween are constructed as trapeziform wedges, the outer contour being a circular segment. All the jacket parts are guided displaceably in the radial direction in an annular groove (55) with stops (56) fitting therein. The pyramid-shape supporting core (31) has a coaxial flanged socket (39), which is accommodated so as to be axially displaceable with respect to the mould wall (2) between two positions (A, B).

If the supporting core (31) is located in the pushed-in position (A), it drives the jacket parts radially apart, such that they assume the given form for filling the mould cavity (4) and sintering the blank. In the example given, the jacket parts then radially form together a circular outer contour. In the withdrawn position (B) the jacket parts are drawn together by the dovetail guide (31F). The trapeziform jacket parts (33,35,37) have a sharper wedge inclination (K1) at the pyramid (31) than the segment-shaped jacket parts (32,34,36) with the gentler wedge inclination (K2), such that the jacket parts slide with their boundary surfaces (39,39A) against each other on displacement.

When the support core (31) is in the pushed-in position (A) the outer contours of the jacket parts together are circular. At the same time the broadest jacket area (MI) with the greatest radius (AG) with respect to the central axis (Z) lies further inwards in the mould cavity (4) than the narrowest jacket area (ME) with the radius (AE). In the withdrawn position (B) the segment jacket parts (32,34,36) lie with their outer edges against each other and the trapeziform jacket parts (33,35,37) are displaced inwards. At the same time the decreased radius (BV) of the broadest jacket area (MI) is narrower than the narrowest radius (AE) in the narrowest jacket area (ME) when the supporting core (31) is pushed in, so that free removal of the blank from the mould core (3) is made possible.

The inside of the tube (39) leads into an inner chamber (30), closed at one end, of the support core (31), and from there passages (50,51) with nozzles (52) lead through the jacket parts (32–37) and the end wall (31S) of the frusto-pyramidal supporting core (31) into the mould cavity (4). The inner chamber (30) is connected by the tube (39) with the supply device for steam, compressed air and optionally vacuum, such that the blank can be densely sintered and well cooled even on the inside, whereby high quality and mould accuracy are achieved.

The outer contour of the mould core shown can be varied in accordance with the requirements made thereof. Moreover, the number of segments may be increased and a restriction to one or more sector segments is possible. With blanks formed on the outside with undercuts the mould wall (1) is constructed of separable mould wall parts, e.g. in two parts.

An advantageous embodiment of the device for manufacturing fusible cores for full mould casting technology is shown in FIG. 1, where a gate piece (44) is formed in one piece on the blank. A casting mould is manufactured from the blank with the formed-on gate piece by jacketing with temperature-resistant material, in which casting mould the gate piece serves to introduce the liquid metal. Since the gate piece is removed after preparation of the metal casting, its dimensional stability is not critical. For this reason, a pressure and/or temperature sensor (45) is arranged projecting into the mould cavity of the gate piece (44), whereby a substantially more precise measurement of the sintering pressure curve or the sintering temperature is made possible than is possible with the known flush arrangement of sensors in the mould wall. This leads, especially with thin-walled blanks of low density to be manufactured for full mould casting technology, to a high quality and homogeneity thereof, if the sensor signals of increased accuracy are used to regulate the sintering process and the subsequent cooling time.

We claim:
1. A sintering device comprising:
   (i) separable mould walls which together define a mould cavity;
   (ii) a mould core positioned within the cavity and defining an undercut mould surface therein;
   (iii) the core including a hollow frusto-pyramidal central support formed with guideways and a plurality of core segments mounted for slidable movement within the guideways whereby the core is radially expandable and contractable;
   (iv) the segments comprising a plurality of arc-surface segments alternating with trapezoidal segments;
   (v) the mould walls and the core including passages through the support and the sliding segments for introducing steam and air into the cavity;
   (vi) the passages of the core placing the hollow interior of the central support in communication with the mould cavity.

2. A sintering device as claimed in claim 1 wherein the core is movable axially within the mould cavity and the hollow interior of the core is placed in communication with sources of steam and air through a tube movable axially with the core.

3. A sintering device as claimed in claim 1 wherein the angles of inclination of the trapezoidal segments are greater than the angles of inclination of the arc-surface segments.

4. A sintering device as claimed in claim 1 wherein the bearing surfaces of the guideways and the segments have a titanium coating to harden the bearing surfaces.

5. A sintering device as claimed in claim 1 wherein the bearing surface of the guideways and the segments have been nitrification hardened by subjection to electron beam or laser beam bombardment.

6. A sintering device as claimed in claim 1 wherein one mould wall includes a gate piece through which plastics material can be introduced into the mould cavity and into which projects a sensor operable to measure at least one of the temperature and the pressure of plastics material present within the mould cavity during sintering and cooling of the plastics material.

* * * * *